Sept. 16, 1969  G. A. ZAZOFSKY  3,467,959
METRONOME
Filed May 23, 1966  2 Sheets-Sheet 1

INVENTOR.
GEORGE A. ZAZOFSKY
BY
Wolf, Greenfield & Hicken
ATTORNEYS

United States Patent Office 3,467,959
Patented Sept. 16, 1969

3,467,959
METRONOME
George A. Zazofsky, Waban, Mass. (% Boston Symphony
Orchestra, Symphony Hall, Boston, Mass. 02115)
Filed May 23, 1966, Ser. No. 552,146
Int. Cl. G08b 3/00; G04b 21/00
U.S. Cl. 340—384                 3 Claims

ABSTRACT OF THE DISCLOSURE

A metronome includes a foot pedal for controlling the beat rate over a continuous range and a meter that indicates the beat rate in response to the rate of the beat. A feature of the invention resides in a foot pedal multiplier switch that allows a musician to control the beat rate to a selected multiple of the fundamental beat rate.

---

The present invention relates in general to metronomes and more particularly concerns a novel electronic metronome characterized by features which enable a musician to continuously alter the beat while still playing and selectively change the beat instantaneously by a predetermined integral number to aid musicians in playing a burst of short notes in precise tempo.

According to the invention, there is a source of beat pulses. Means are provided for continuously adjusting the rate of the pulses provided by the source. Means are provided for indicating the occurrence of selected pulses to one or more senses of a musician. Means are also provided for substantially instantaneously altering the rate of indicated pulses by an integral number. Preferably means are provided for providing a visual indication of the rate at which sense stimulating pulses are provided. Means are also provided for controlling the apparatus remotely, preferably with foot pedal means so that a musician may continuously adjust the rate to a value indicated by visible indicating means and/or substantially instantaneously change the rate by an integral number.

Metronomes are well known in the musical art and used to help musicians achieve the correct tempo. One important shortcoming with conventional metronomes is that in order for the musician to change the beat, he must stop playing and readjust. This is especially disadvantageous when playing selections where the tempo changes during the selection, either suddenly, or gradually, as in ritardando and accelerando passages. If the performer stops and adjusts the metronome, the continuity of the music is disrupted. If the performer alters his tempo without changing the metronome beat, the musician must rely on an estimate of the correct tempo relative to the beat indicated by the metronome. Under such conditions, the metronome, if anything, is likely to make it more difficult for the musician to achieve the correct tempo.

Accordingly, it is an important object of this invention to provide a metronome that can easily and continuously be adjusted by the musician to virtually any desired beat of practical interest while continuing to play.

It is a further object of the invention to achieve the preceding object while providing means for substantially instantaneously changing the indicated beat by an integral number to aid the musician in playing a series of short notes in precise tempo.

It is another object of the invention to achieve the preceding objects with relatively compact apparatus convenient to carry from place to place while being relatively easy to operate for a musician as he continues to play.

Numerous other features, objects and advantages of the invention will become apparent from the following specification when read in connection with the accompanying drawing in which:

FIG. 1 is a perspective view of an exemplary embodiment of the invention with remote controls represented by appropriately labeled blocks;

Figure 3:
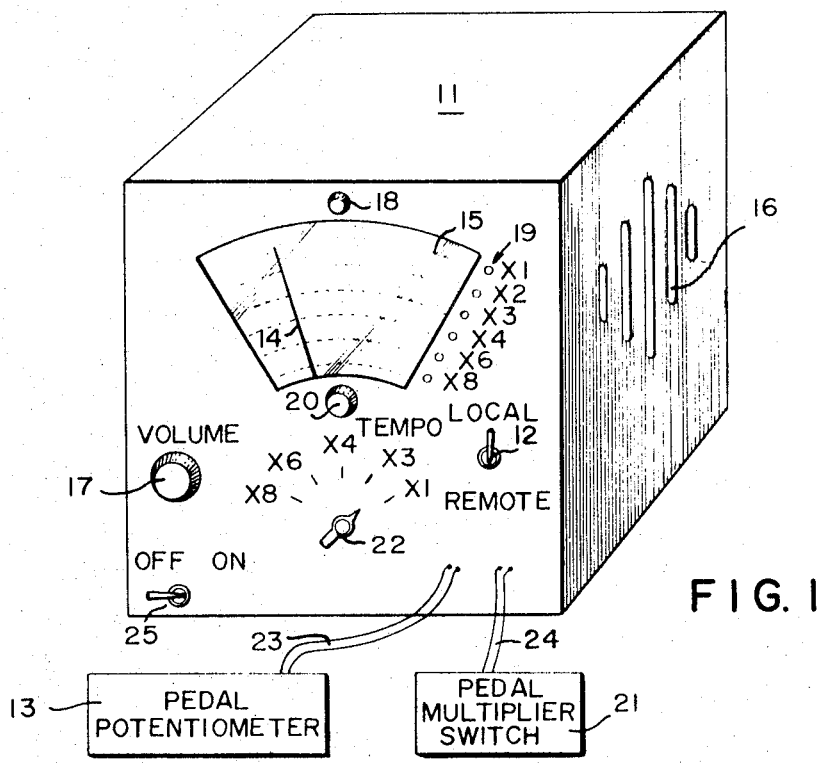
FIG. 3 is a timing diagram helpful in understanding how the specified integrally related beat rates are obtained.

With reference now to the drawing and more particularly FIG. 1 thereof, there is shown a perspective view of an exemplary embodiment of the invention in which most of the components are associated with the case 11 housing most of the system components. With local-remote switch 12 in the remote position, actuation of the pedal potentiometer 13 controls the rate of the sensed beat to a value indicated by the pointer 14 on the meter 15. A beat may be indicated aurally through loudspeaker 16 at a sound level set by volume control 17 and visually by light bulb 18. A pedal multiplier switch 21 then performs the function of panel multiplier switch 22 to substantially instantaneously change the beat indicated by the sound impulses from loudspeaker 16 and the light impulses from bulb 18 by the integral multiples ×3, ×4, ×6 and ×8, the selected multiple preferably being indicated by the illuminated one of bulbs 19 beside the corresponding scale. And pedal potentiometer 13 then performs the function of tempo adjust potentiometer 20 in controlling the contemporary fundamental beat. Pedal potentiometer 13 is coupled to the unit by remote cable 23; pedal multiplier switch 21, by remote cable 24. A power switch 25 turns the device on.

Figure 2:
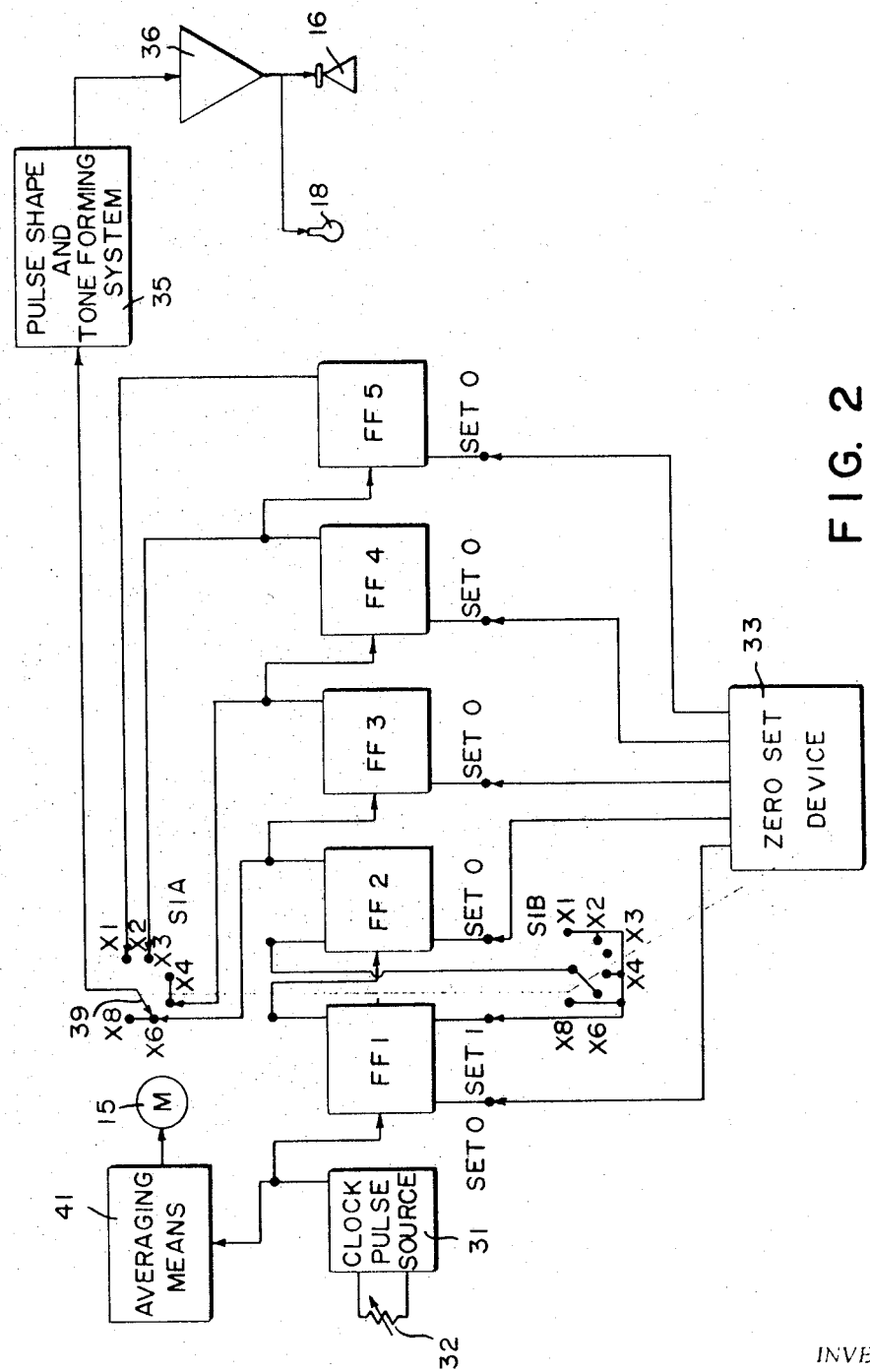
FIG. 2 is a block diagram illustrating the logical arrangement of a metronome system according to the invention.

Referring to FIG. 2, there is shown a block diagram illustrating the logical arrangement of a metronome according to the invention. Since the individual elements of the system are known in the electrical art, circuit details are omitted so as not to obscure the principles of this invention. Clock pulse source 31 preferably provides a train of equal energy pulses at a rate determined by the setting of potentiometer 32 which may be either pedal potentiometer 13 or panel potentiometer 20, depending upon the position of local-remote switch 12. The specific circuitry of source 31 may comprise any of the number of well known relaxation type circuits. These clock pulses drive a chain of five cascaded flip-flops designated FF1–FF5, respectively. The system is so arranged that with ganged switches S1A and S1B in the ×1 position, flip-flop FF5 provides one pulse for every 25 pulses provided by clock pulse source 31. In the ×2 position, flip-flop FF4 provides two pulses for every 25 pulses provided by clock pulse source 31. With switch S1 in the ×3 position, flip-flop FF3 provides three pulses for every 25 pulses provided by clock pulse source 31. With switch S1 in the ×4 position, flip-flop FF3 provides four pulses for every 25 pulses provided by clock pulse source 31. With switch S1 in the ×6 position, flip-flop FF2 provides six pulses for every 25 pulses provided by clock pulse source 31. With switch S1A in the ×8 position, flip-flop FF2 provides eight pulses for every 25 pulses provided by clock pulse source 31. These results occur because the output of flip-flop FF2 sets ONE in the first flip-flop FF1 through the contacts of switch S1B for every setting except the ×3 and ×6 settings.

The way in which the different flip-flops produce the desired number of pulses will be better understood from referring to FIG. 3 which shows the number of pulses from the different significant flip-flops for a period of twenty-four intervals between successive clock pulses, the outputs with feedback through switch S1B being below the clock pulses demonstrating how the multiplication of rate by ×2, ×4 and ×8 occurs while the straight binary division without feedback is represented above the clock pulses to show how the rates of ×3 and ×6 times the fundamental rate occurs. All logic pulses are assumed to occur in response to a change in state from ONE to ZERO. Each time switch S1 is moved to a different position the zero set device 33 produces a pulse that sets each of the five flip-flops to the ZERO state. The specific means for effecting this result could be any of numerous techniques well known to those skilled in the art. For example, a permanent magnet could be attached to the shaft of switch S1 closely adjacent to a pickup coil which would receive an impulse each time the switch was actuated. Alternatively, switch S1 could have a third set of contacts comprising zero set device 33 and a source of D-C potential arranged to be shorted each time this switch moves from one position to another to produce a setting impulse. Numerous other techniques for accomplishing this would be known to those skilled in the art.

The train of pulses on the arm 34 of switch S1A are applied to the pulse shaper and tone forming system 35 which may provide a short tone burst of pleasing pitch in response to each pulse that is applied to amplifier 36 and then to loudspeaker 16 and bulb 18 to provide a tone burst and light impulse for each pulse provided on the arm 34.

The connections of the local remote switch 12 to the pedal multiplier switch 21, the pedal potentiometer 13, the panel multiplier switch 22 and the panel tempo control 20 are well known in the art and have not been shown in the drawing to avoid obscuring the principles of the invention. Both multiplier switches are represented by switch S1 and both tempo potentiometers are represented by the potentiometer 32.

Clock pulse source 31 also preferably energizes averaging means 41 which in turn provides a D-C signal to meter 15 proportional to the clock pulse rate determined by the setting of potentiometer 32. Averaging means 41 and meter 15 thus comprise means for measuring and indicating the pulse rate. The meter face may have six parallel scales corresponding to each of the positions of switch S1. Since there is an integral relationship among the six switch positions and the beat rate, the various scales may be calibrated in accordance with the same ratio. Thus, if the center of the scale for ×1 correspounded to 100 beats per minute, the center position for ×2, ×3, ×4, ×6 and ×8 would correspond to 200, 300, 400, 600 and 800 beats per minute, respectively.

Switch S1 may be fitted with an extra set of contacts that illuminate that one of the bulbs 19 corresponding to the multiplier switch position selected.

Preferably pedal multiplier switch 21 is a spring loaded switch normally maintained in the ×1 position with detent action so that the musician can feel the transition through each position. That is, if he wishes to select the ×3 position, he feels two clicks and then knows that he is in the ×3 position even without observing which of the bulbs 19 is then illuminated.

Pedal potentiometer 13 may comprise a pedal attached to a potentiometer shaft. The pedal may be preferably raised and lowered so that the musician may use his foot to select the contemporary tempo.

There has been described an especially advantageous metronome offering numerous features. If the musician is playing a composition of invariant tempo, he need only put the switch 12 in the local position and adjust tempo control 20 until the pointer 14 indicates the correct tempo on meter 15. If the musician wants to alter the beat during the course of playing the composition, he need only put switch 12 in the remote position and operate pedal potentiometer 13 until pointer 14 designates the desired tempo. If a rapid burst of short 32nd notes are to be played in a 4—4 passage and the musician wants a beat for each 32nd note, he need only press pedal multiplier switch to the extreme position, and a beat for each 32nd note will be emitted. Upon completion of the 32nd notes, the musician may release pedal multiplier switch 21, and the selected beat for each quarter note will continue. If the tempo of a passage changes, the musician need only alter the position of pedal potentiometer 13 to the desired new beat. For effecting gradual changes in tempo during accelerando or ritardando, the musician may raise or lower the pedal gradually.

It is evident that those skilled in the art may now make numerous modifications of and departures from the specific embodiment described herein without departing from the inventive concepts.

What is claimed is:
1. A metronome comprising,
means for generating pulses,
foot actuated means for controlling the repetition rate of said pulses over a continuous range,
means responsive to said pulses for providing a sensible indication of each pulse beat,
and means for measuring said pulse rate,
said measuring means indicating said pulse rate.
2. A metronome in accordance with claim 1 and further comprising means for substantially instantaneously altering said pulse rate by any one of a predetermined plurality of integral numbers.
3. A metronome in accordance with claim 2 wherein said means for altering comprises means remote from said measuring means operable by the foot of a musician who may thereby control said pulse rate to a selected multiple of a fundamental rate within said continuous range.

References Cited

UNITED STATES PATENTS

| | | | |
|---|---|---|---|
| 2,472,604 | 6/1949 | McDonald | 200—86.5 X |
| 3,271,670 | 9/1966 | Esakov et al. | |
| 3,332,076 | 7/1967 | Burson | 340—384 |

JOHN W. CALDWELL, Primary Examiner

CHARLES M. MARMELSTEIN, Assistant Examiner

U.S. Cl. X.R.
84—484